US008385092B1

(12) United States Patent
Shekhawat

(10) Patent No.: US 8,385,092 B1
(45) Date of Patent: Feb. 26, 2013

(54) POWER CONVERTER WITH CURRENT VECTOR CONTROLLED DEAD TIME

(75) Inventor: Sampat Shekhawat, Mountaintop, PA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 182 days.

(21) Appl. No.: 11/891,976

(22) Filed: Aug. 14, 2007

(51) Int. Cl.
*H02M 7/538* (2007.01)
(52) U.S. Cl. .................. 363/56.04; 363/41; 363/132
(58) Field of Classification Search .......... 363/56.04, 363/41, 132, 56.02, 89, 98
See application file for complete search history.

(56) References Cited

U.S. PATENT DOCUMENTS

| 4,961,129 | A | | 10/1990 | Shekhawat | |
|---|---|---|---|---|---|
| 5,093,771 | A | * | 3/1992 | Harvest | 363/98 |
| 5,719,519 | A | * | 2/1998 | Berringer | 327/423 |
| 6,016,258 | A | * | 1/2000 | Jain et al. | 363/17 |
| 6,038,152 | A | * | 3/2000 | Baker | 363/89 |
| 6,294,954 | B1 | * | 9/2001 | Melanson | 330/10 |
| 6,661,208 | B2 | * | 12/2003 | Rutter et al. | 323/224 |
| 6,714,424 | B2 | * | 3/2004 | Deng et al. | 363/17 |
| 6,867,645 | B1 | * | 3/2005 | Ansari et al. | 327/588 |
| 7,102,322 | B2 | * | 9/2006 | Suzuki | 318/801 |
| 7,286,375 | B1 | * | 10/2007 | Welchko et al. | 363/41 |
| 7,868,597 | B2 | * | 1/2011 | Dequina | 323/222 |
| 2005/0195622 | A1 | * | 9/2005 | Lehman et al. | 363/17 |

FOREIGN PATENT DOCUMENTS

KR    2001010270 A    *  2/2001

* cited by examiner

*Primary Examiner* — Harry Behm
(74) *Attorney, Agent, or Firm* — Sidley Austin LLP

(57) ABSTRACT

In one embodiment, a method is provided for a power converter system comprising a switching circuit having a plurality of switches operable to be turned on and off to cause current to flow to deliver power to a load. The method includes the following: generating PWM control signals for turning on and off the switches in the switching circuit; sensing the direction of current flow, wherein the direction of current flow is related to a likelihood of shoot-through in the switching circuit; providing a current vector signal indicative of the direction of current flow; and enabling or disabling introduction of a dead time into the PWM control signals for the switches in the switching circuit in response the current vector signal.

39 Claims, 6 Drawing Sheets

POWER CONVERTER WITH CURRENT VECTOR CONTROLLED DEAD TIME

BACKGROUND

1. Field of Invention

The present invention relates to power conversion, and more particularly, to a power converter with current vector controlled dead time.

2. Description of Related Art

Power converters are essential for many modern electronic devices. Among other capabilities, power converters can adjust power level downward (buck converter) or adjust power level upward (boost converter). Power converters may also convert from alternating current (AC) power to direct current (DC) power, or vice versa. Power converters are typically implemented using one or more switching devices, such as transistors, which are turned on and off to deliver power to the output of the converter.

One topology for a power converter system may be include a full-bridge inverter. Full-bridge inverter topology is used extensively in uninterruptible power supply (UPS) and solar power systems to convert DC power to AC power. If not well-controlled, full-bridge inverters can produce significant harmonics, which adversely affects the performance of a power converter.

SUMMARY

In one embodiment, a full-bridge inverter circuit with current vector controlled dead time is provided. The full-bridge inverter circuit can be used in a DC-to-AC converter system, and may reduce harmonics and filter size.

According to an embodiment of the present invention, a power converter system includes a switching circuit having a plurality of switches operable to be turned on and off to cause current to flow to deliver power to a load. A pulse width modulation (PWM) control circuit generates PWM control signals for turning on and off the switches in the switching circuit. A dead time generation circuit, coupled to the control circuit, is operable to introduce a dead time into the PWM control signals for the switches in the switching circuit. A sensor circuit senses the direction of current flow. The direction of current flow is related to a likelihood of shoot-through in the switching circuit. The sensor circuit outputs a current vector signal indicative of the direction of current flow. A dead time enable/disable circuit, coupled to the sensor circuit, enables or disables the introduction of dead time into the PWM control signals in response the current vector signal from the sensor circuit.

According to another embodiment of the present invention, a method is provided for a power converter system comprising a switching circuit having a plurality of switches operable to be turned on and off to cause current to flow to deliver power to a load. The method includes the following: generating PWM control signals for turning on and off the switches in the switching circuit; sensing the direction of current flow, wherein the direction of current flow is related to a likelihood of shoot-through in the switching circuit; providing a current vector signal indicative of the direction of current flow; and enabling or disabling introduction of a dead time into the PWM control signals for the switches in the switching circuit in response the current vector signal.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 5 of the drawings. Like numerals are used for like and corresponding parts of the various drawings.

In various embodiments, the present invention provides systems and methods which enable/disable the provision of dead time for a full-bridge inverter circuit based on current vector. The full-bridge inverter circuit, which can be used in a DC-to-AC power converter system, includes a plurality of switches. The dead time (Td) may be needed to protect the switches in the full-bridge inverter circuit against different power factor loads and likelihood of short circuit or shoot-through. Dead time increases total harmonic distortion (THD) in the full-bridge inverter circuit because it reduces optimized pulse width for the switches of the circuit. Embodiments of the invention substantially reduce or eliminate the dead time when it is not needed.

Furthermore, in some embodiments, the present invention increases the efficiency of the power converter by optimizing conduction losses in addition to reducing switching losses. In some embodiments, this reduces heat sink size as well as increasing power density of the converter system.

Embodiments of the present invention can be used to reduce or eliminate dead time in other circuits besides full-bridge inverter circuits. For example, circuitry according to embodiments of the present invention can be used with a half-bridge configuration (e.g., comprising upper and lower switches) or with a full-bridge rectifier configuration (in an AC-to-DC power converter). For clarity, the remainder of this description focuses on the use of embodiments of the invention with a full-bridge inverter circuit, but one of ordinary skill understands that the invention is not so limited.

Figure 1:
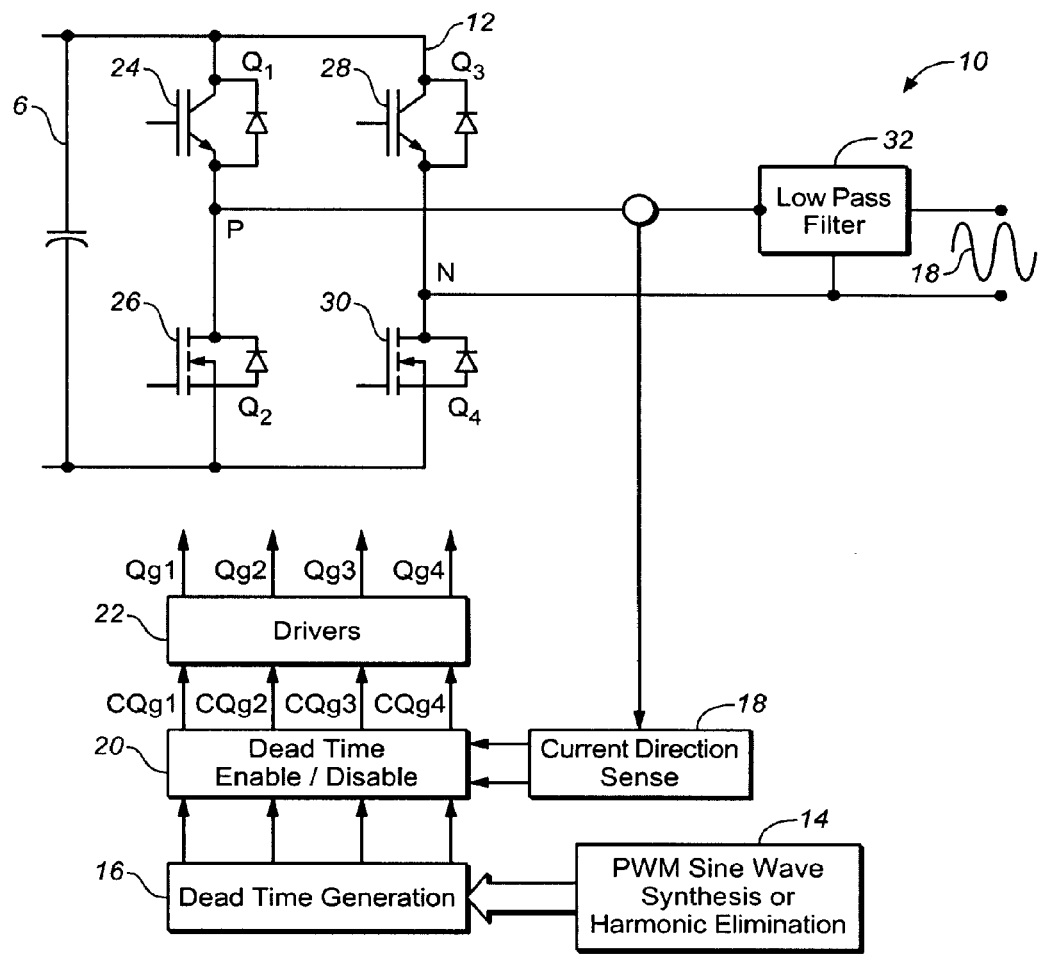
FIG. 1 is a schematic diagram of an exemplary implementation for a power converter system having a full-bridge inverter with current vector controlled dead-time, according to an embodiment of the invention.

FIG. 1 is a schematic diagram of an exemplary implementation for a power converter system 10 having a full-bridge inverter 12 with current vector controlled dead-time, according to an embodiment of the invention. Such power converter system 10 can be a DC-to-AC converter for converting direct current (DC) power to alternating current (AC) power. Power converter system 10 receives the DC power from a DC power source at an input terminal 6, and delivers AC power to a load at an output terminal 8. The power converter system 10 may have higher efficiency than previous designs, because both conduction losses as well as switching losses are optimized in system 10. As shown, full-bridge inverter system 10 includes full-bridge inverter circuit 12, a pulse width modulation (PWM) control block 14, a dead-time generation block 16, a current direction sense block 18, a dead-time enable/disable block 20, a driver block 22, and an output filter 32.

Full-bridge inverter circuit 12 comprises switches 24, 26, 28, and 30 (also labeled Q1, Q2, Q3, and Q4, respectively), each of which may each be implemented as a transistor. As shown, switches 24 and 28 are implemented as insulated gate bipolar transistors (IGBTs), whiles switches 26 and 30 are implemented as metal-oxide-semiconductor field effect transistors (MOSFETs). It is understood that other transistor implementations are possible, such as, for example, bipolar junction transistors (BJTs), insulated gate field effect transistors (IGFETs), etc. Each switch 24, 26, 28, and 30 may have a body diode (FRD). Switches 24 and 26 form a first leg for the full-bridge inverter circuit 12, while switches 28 and 30 form a second leg for the inverter circuit 12. The output of full-bridge inverter circuit 12 is provided at a first terminal (P) and a second terminal (N).

The full-bridge inverter circuit 12 can be operated in different modes to convert DC power to AC power. In one exemplary operation for the full-bridge inverter circuit 12, the switches in each leg are alternatingly turned on and off during positive and negative half-cycles to deliver AC power to the load through terminals P and N. In particular, in each positive half-cycle, while switch 24 is maintained on and switch 26 is maintained off in the first leg, the switches 28 and 30 in the second leg are alternatingly turned on and off. This causes current to flow from the DC power source through switch 24 to the load (through terminal P) in a first direction and back either through switch 30 to ground or free wheel through the co-pack diode of switch 28. In each negative half-cycle, the reverse occurs. While switch 28 is maintained on and switch 30 is maintained off in the second leg, the switches 24 and 26 in the first leg are alternatingly turned on and off. This causes current to flow from the DC power source through switch 28 to the load (through terminal N) in a second direction (which is opposite the first direction) and back through switch 26 to ground or free wheel through switch 24 depending on power factor of the load.

In one embodiment, a positive direction of current flow corresponds to current entering through the drain or collector terminal of a switch and coming out of the source or emitter terminal. A negative direction of current flow corresponds to current flowing into the source or emitter terminal of a switch and out through the collector or drain terminal.

Output filter 32 is coupled to the full-bridge inverter circuit 12 to reduce total harmonic distortion (THD). As used herein, the terms "coupled" or "connected," or any variant thereof, covers any coupling or connection, either direct or indirect, between two or more elements. Output filter 32 can be a low-pass (LP) filter, and may be implemented with one or more inductors and capacitors, as understood by one of ordinary skill in the art.

Driver block 22 is coupled to the switches 24, 26, 28, and 30 of the full-bridge circuit 12. Driver block 22 provides drive signals to the control terminals (e.g., gates or bases) of the switches for turning on and off the same. A separate drive signal (i.e., Qg1, Qg2, Qg3, Qg4) is provided for each switch 24, 26, 28, or 30.

PWM control block 14 and dead-time generation block 16 may be implemented in any suitable logic for providing control signals for turning on and turning off switches 24, 26, 28, and 30. PWM control block 14 generates or provides control signals (i.e., CQ1, CQ2, CQ3, CQ4 (or CQ[1:4])) to implement pulse width modulation (PWM). PWM is a technique which is commonly employed to vary the width of the pulse in a periodic signal for turning on and off the switching devices in a power converter. With PWM, the frequency is held constant and the width of each pulse is varied to form a fixed-frequency, variable-duty cycle operation.

Dead-time generation block 16 functions to provide for dead time in the switching of switches 24, 26, 28, and 30. In particular, in each positive half-cycle, dead time may be provided between the moment that switch 28 is turned off and the moment that switch 30 is turned on in the second leg of the full-bridge inverter circuit 12, and vice versa. In each negative half-cycle, dead time may be provided between the moment that switch 24 is turned off and the moment that switch 26 is turned on in the first leg of the full-bridge inverter circuit 12, and vice versa. The amount of dead time can be, for example, in the range of 50 nsec up to 2 microsec, depending on the implementation of the switches 24, 26, 28, and 30. If there is no dead time between the turning off and on of the switches in a leg of the full-bridge inverter circuit 12, shoot-through (short circuit) may occur through that leg, which can damage the switches in that leg and/or cause an increase in power loss in the switches.

Dead-time generation block 16 is coupled to and receives the PWM control signals from PWM control block 14. Dead-time generation block 16 operates on the PWM control signals CQ1, CQ2, CQ3, and CQ4 output from PWM control block 14. If enabled, dead-time generation block 16 provides or introduces dead time in the PWM control signals by reducing the pulse width (duty cycle) of the control signals so that, for example, there is a delay between the moment that switch 28 is turned off and the moment that switch 30 is turned on in the second leg of the full-bridge inverter circuit 12 during the positive half-cycle, or for example, there is a delay between the moment that switch 24 is turned off and the moment that switch 26 is turned on in the first leg of the full-bridge inverter circuit 12 during the negative half-cycle. This dead time increases THD because it reduces optimized pulse width; that is, the pulse width of the CQ1, CQ2, CQ3, CQ4 PWM signals is reduced by the amount of dead introduced by dead-time generation block 16.

With previously developed designs, dead time is introduced for every transition between the turning off of one switch and the turning on of the other switch in either leg of a full-bridge inverter circuit during a positive or negative half-cycle. This forced circuit designers to increase the size of the output filter for the inverter circuit, thereby causing an increase in THD. This increase in THD can be, for example, in the range of 1% to 3% depending on the amount of dead time introduced.

If a body diode (FRD) is conducting, there are minimal minority carriers present in its co-pack switch (e.g., IGBT). When the gate signal of the switch is removed, and a gate signal is applied to the complimentary switch (e.g., in the same leg), there is very little likelihood of shoot-through or short circuit, and thus, no dead time is necessary.

According to some embodiments, the present invention substantially reduces or eliminates the dead time in a full-bridge inverter circuit during any cycle when it is not needed. This reduces total harmonic distortion (THD) in the power converter. In particular, if a switch in a leg of full-bridge inverter circuit 12 is turned on when its switch, complimentary body diode (FRD) is conducting current, then there is almost no chance of shoot-through in that leg. Accordingly, the dead time of the on-coming switch is unnecessary, and thus can be eliminated or substantially reduced (e.g., in the range of 20-50 nsec), thereby improving THD as well as efficiency. This allows the filter size to be reduced.

To accomplish this, in one embodiment, current direction sense block 18 is coupled to and senses current at the output of the full-bridge inverter circuit 12. Current direction sense block 18 can determine by current vector whether a body diode of a switch that is turning off is conducting current or whether the switch itself is conducting current. In one embodiment, current direction sense block 18 can be implemented with a current comparator. Current direction sense block 18 may output one or more signals indicating the direction of current flow in the legs of full-bridge inverter circuit 12. In one embodiment, a positive direction of current flow corresponds to current entering through the drain or collector terminal of a switch and coming out of the source or emitter terminal; and negative direction of current flow corresponds to current flowing into the source or emitter terminal of a switch and out through the collector or drain terminal.

Dead-time enable/disable block 20 is coupled to dead-time generation block 16 and current sense block 18. Dead-time enable/disable block 20 receives the one or more sense signals from current sense block 18 and, in response, enables or disables the introduction of dead time by dead-time generation block 16 to control signals CQ1, CQ2, CQ3, CQ4. Dead-time enable/disable block 20 outputs control signals CQg1, CQg2, CQg3, CQg4. These control signals CQg1, CQg2, CQg3, CQg4 can be substantially similar to PWM control signals CQ1, CQ2, CQ3, CQ4, respectively, if dead time is not provided (i.e., dead-time disabled). Alternately, if dead time is provided (i.e., dead-time enabled), dead-time enable/disable block 20 reduces the pulse width of one or more of PWM control signals CQ1, CQ2, CQ3, CQ4 to provide the control signals CQg1, CQg2, CQg3, CQg4, respectively.

In operation, for each positive half-cycle (where switch 24 is maintained on, switch 26 is maintained off, and switches 28 and 30 are alternatingly turned on and off), current direction sense block 18 and dead-time enable/disable block 20 operate as follows. If current is flowing in a positive direction from switch 24 through filter 32 to load and then through switch 30 back to DC, dead time is unnecessary because shoot through is not likely. Current direction sense block 18 senses the positive direction flow or vector of current and provides a signal to the dead-time enable/disable block 20 indicating the same. In response to the indication of positive current vector, dead-time enable/disable block 20 does not provide for dead time between the moment that switch 28 is turned off and the moment that switch 30 is turned on. As such, the pulse width of PWM control signal CQ4 for switch 30 is not reduced, and thus harmonic distortion is not increased. Alternately, if current is flowing in a negative direction from the load through filter 32 back through switch 24, dead time is necessary because shoot through is likely. Current direction sense block 18 senses the negative direction flow or vector of current and provides a signal to the dead-time enable/disable block 20 indicating the same. In response to the indication of negative current vector, dead-time enable/disable block 20 does provides for dead time between the moment that switch 28 is turned off and the moment that switch 30 is turned on, thereby preventing shoot through.

For each negative half-cycle (where switch 28 is maintained on, switch 30 is maintained off, and switches 24 and 26 are alternatingly turned on and off), current direction sense block 18 and dead-time enable/disable block 20 operate as follows. If current is flowing in a negative direction from switch 28 through filter 32 to load and then through switch 26 back to DC, dead time is unnecessary because shoot through is not likely. Current direction sense block 18 senses the negative current vector and provides a signal to the dead-time enable/disable block 20 indicating the same. In response to the indication of negative current vector, dead-time enable/disable block 20 does not provide for dead time between the moment that switch 26 is turned off and the moment that switch 24 is turned on. As such, the pulse width of PWM control signal CQ2 for switch 26 is not reduced, and thus harmonic distortion is not increased. Alternately, if current is flowing in a positive direction from switch 24 through filter 32 to the load back through the complimentary body diode (FRD) of switch 24, dead time is necessary because shoot through is likely. Current direction sense block 18 senses the positive current vector and provides a signal to the dead-time enable/disable block 20 indicating the same. In response to the indication of positive current flow, dead-time enable/disable block 20 does provides for dead time between the moment that switch 28 is turned off and the moment that switch 30 is turned on, thereby preventing shoot through.

An exemplary operation for power converter system 10 is shown and described in more detail with reference to FIGS. 2A and 2B.

In some embodiments, all or a portion of the components of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals there between.

Figure 2A:
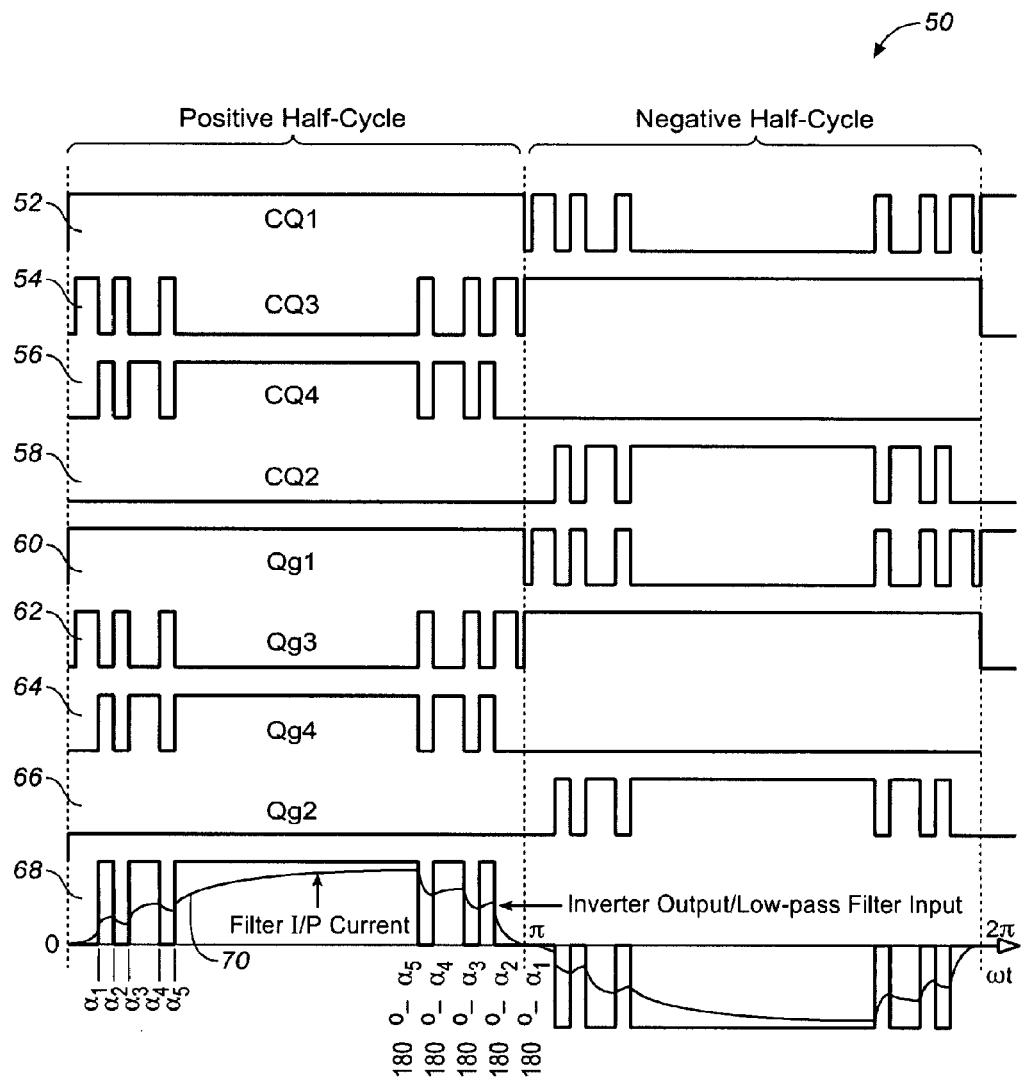
FIGS. 2A and 2B are exemplary timing diagrams for the implementation of the power converter system shown in FIG. 1, according to an embodiment of the invention.
Figure 2B:
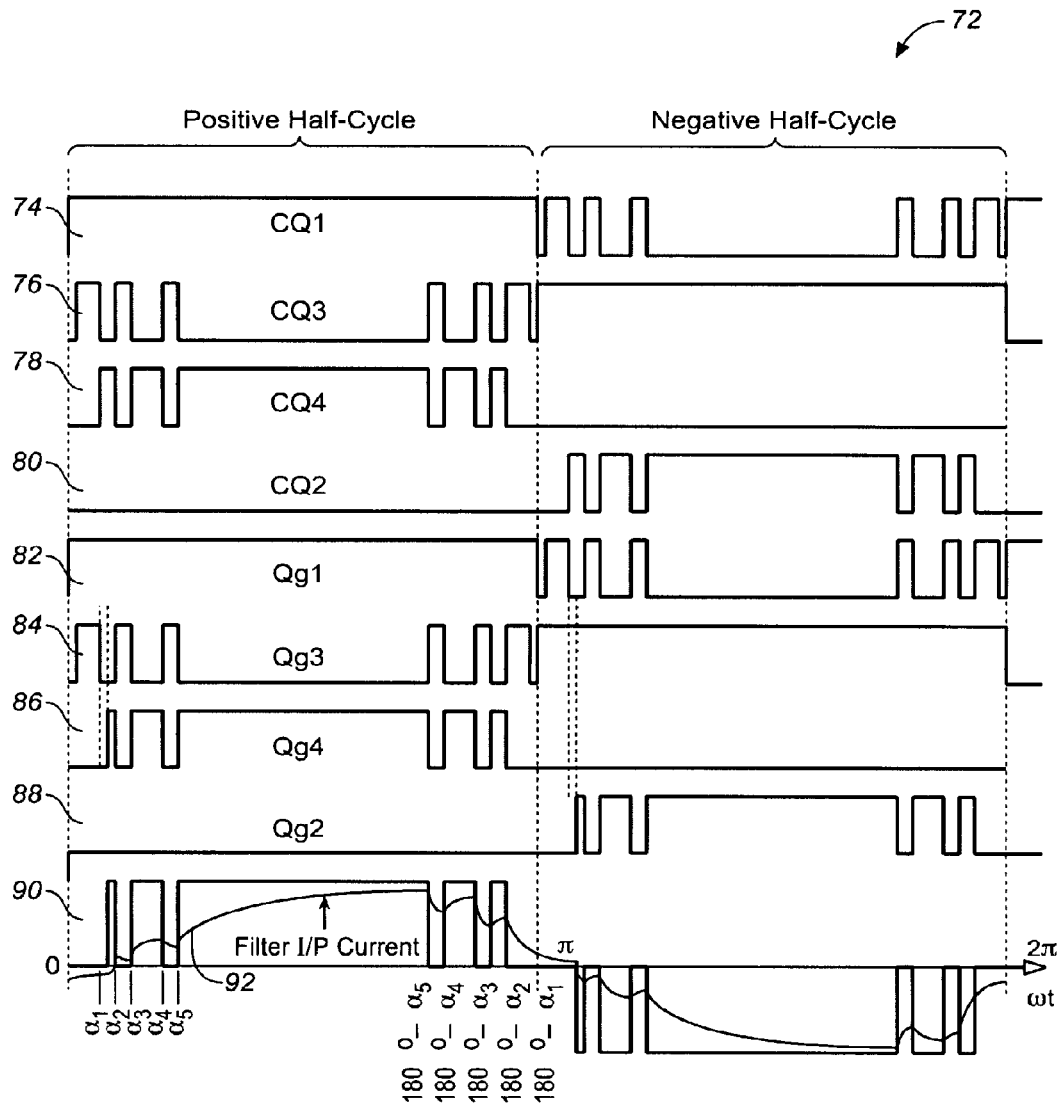

FIGS. 2A and 2B are exemplary timing diagrams for the implementation of the power converter system 10 shown in FIG. 1, according to an embodiment of the invention.

FIG. 2A illustrates a case in which dead time is not necessary. Timing diagram 50 includes a number of waveforms 52, 54, 56, and 58, which generally represent the voltage level for the PWM control signals CQ1, CQ2, CQ3, and CQ4, respectively, output from PWM control block 14 for controlling switches 24, 26, 28, and 30. Waveforms 60, 62, 64, and 66 represent the voltage level for the drive signals Qg1, Qg2, Qg3, and Qg4, respectively, output from driver block 22 for driving switches 24, 26, 28, and 30. Waveform 68 represents the voltage output (at positive terminal P) of the full-bridge inverter circuit 12. Waveform 70, which is superimposed on waveform 68, represents the current flowing from full-bridge inverter circuit 12 (at positive terminal P). Timing diagram 50 illustrates one cycle for the operation of the power converter system 10. The left side of timing diagram is the positive half-cycle, and the right side of the diagram is the negative half-cycle.

Referring to FIGS. 1 and 2A, in the positive half-cycle, driver block 22 outputs a high value for control signal Qg1 to maintain or keep switch 24 turned on and outputs a low value for control signal Qg2 to maintain or keep switch 26 turned off in the first leg of full-bridge inverter circuit 12. PWM control block 14 causes control signals CQ3 and CQ4 to change between high and low values in order to alternatingly turn on and off switches 28 and 30 in the second leg of full-bridge inverter circuit 12. Current direction sense block 18 detects the direction of current flow (current vector) through the P terminal of full-bridge inverter circuit 12. As shown, the current flow is always positive in the positive half-cycle. Thus, dead time is not necessary because shoot through is not likely. Current direction sense block 18 provides a signal to the dead-time enable/disable block 20 indicating the positive current vector. In response to the indication of positive current vector, dead-time enable/disable block 20 disables the introduction of a dead time (by dead time generation block 16) between the control signals Qg3 and Qg4 applied to switches 28 and 30. As such, there is almost no delay (dead time), for example, between the moment that switch 28 is turned off and the moment that switch 30 is turned on. Accordingly, the pulse width of PWM control signal CQ4 for switch 30 is not reduced, and thus harmonic distortion is not increased.

In the negative half-cycle, driver block 22 outputs a high value for control signal Qg3 to maintain or keep switch 28 turned on and outputs a low value for control signal Qg4 to maintain or keep switch 30 turned off in the second leg of full-bridge inverter circuit 12. PWM control block 14 causes control signals CQ1 and CQ2 to change between high and low values in order to alternatingly turn on and off switches 24 and 26 in the first leg of full-bridge inverter circuit 12. Current direction sense block 18 detects the direction of current flow (current vector) through the P terminal of full-bridge inverter circuit 12. As shown, the current flow is always positive in the negative half-cycle. Thus, dead time is not necessary because shoot through is not likely. Current direction sense block 18 provides a signal to the dead-time enable/disable block 20 indicating the positive current vector. In response to the indication of positive current vector, dead-time enable/disable block 20 disables the introduction of a dead time (by dead time generation block 16) between the control signals Qg1 and Qg2 applied to switches 24 and 26. As such, there is almost no delay (dead time), for example, between the moment that switch 24 is turned off and the moment that switch 26 is turned on. Accordingly, the pulse width of PWM control signal CQ4 for switch 30 is not reduced, and thus harmonic distortion is not increased.

FIG. 2B illustrates a case in which dead time is needed. Timing diagram 72 includes a number of waveforms 74, 76, 78, and 80, which generally represent the voltage level for the PWM control signals CQ1, CQ2, CQ3, and CQ4, respectively, output from PWM control block 14 for controlling switches 24, 26, 28, and 30. Waveforms 82, 84, 86, and 88 represent the voltage level for the drive signals Qg1, Qg2, Qg3, and Qg4, respectively, output from driver block 22 for driving switches 24, 26, 28, and 30. Waveform 90 represents the voltage output (at positive terminal P) of the full-bridge inverter circuit 12. Waveform 92, which is superimposed on waveform 90, represents the current flowing from full-bridge inverter circuit 12 (at positive terminal P). Timing diagram 72 illustrates one cycle for the operation of the power converter system 10. The left side of timing diagram is the positive half-cycle, and the right side of the diagram is the negative half-cycle.

Referring to FIGS. 1 and 2B, in the positive half-cycle, driver block 22 outputs a high value for control signal Qg1 to maintain or keep switch 24 turned on and outputs a low value for control signal Qg2 to maintain or keep switch 26 turned off in the first leg of full-bridge inverter circuit 12. PWM control block 14 causes control signals CQ3 and CQ4 to change between high and low values in order to alternatingly turn on and off switches 28 and 30 in the second leg of full-bridge inverter circuit 12. Current direction sense block 18 detects the direction of current flow (current vector) through the P terminal of full-bridge inverter circuit 12. As shown, the current flow is negative during some portion of the positive half-cycle. Thus, dead time is necessary because otherwise shoot through would occur through switches 28 and 30. Current direction sense block 18 provides a signal to the dead-time enable/disable block 20 indicating the negative current vector during the relevant portion of the positive half-cycle. In response to the indication of negative current vector, dead-time enable/disable block 20 enables the introduction of a dead time (by dead time generation block 16) between the control signals Qg3 and Qg4 applied to switches 28 and 30. As such, there is a delay (dead time), for example, between the moment that switch 28 is turned off and the moment that switch 30 is turned on. Accordingly, the pulse width of PWM control signal CQ4 for switch 30 is reduced, but shoot-through is prevented.

In the negative half-cycle, driver block 22 outputs a high value for control signal Qg3 to maintain or keep switch 28 turned on and outputs a low value for control signal Qg4 to maintain or keep switch 30 turned off in the second leg of full-bridge inverter circuit 12. PWM control block 14 causes control signals CQ1 and CQ2 to change between high and low values in order to alternatingly turn on and off switches 24 and 26 in the first leg of full-bridge inverter circuit 12. Current direction sense block 18 detects the direction of current flow (current vector) through the P terminal of full-bridge inverter circuit 12. As shown, the current flow is negative during some portion of in the negative half-cycle, and dead time is thus necessary because otherwise there would be a shoot through in switches 24 and 26. Current direction sense block 18 provides a signal to the dead-time enable/disable block 20 indicating the negative current vector during the relevant portion of the negative half-cycle. In response to the indication of negative current vector, dead-time enable/disable block 20 enables the introduction of a dead time (by dead time generation block 16) between the control signals Qg1 and Qg2 applied to switches 24 and 26. As such, there is a delay (dead time), for example, between the moment that switch 24 is turned off and the moment that switch 26 is turned on. Accordingly, the pulse width of PWM control signal CQ4 for switch 30 is reduced, but shoot-through is prevented.

Figure 3:
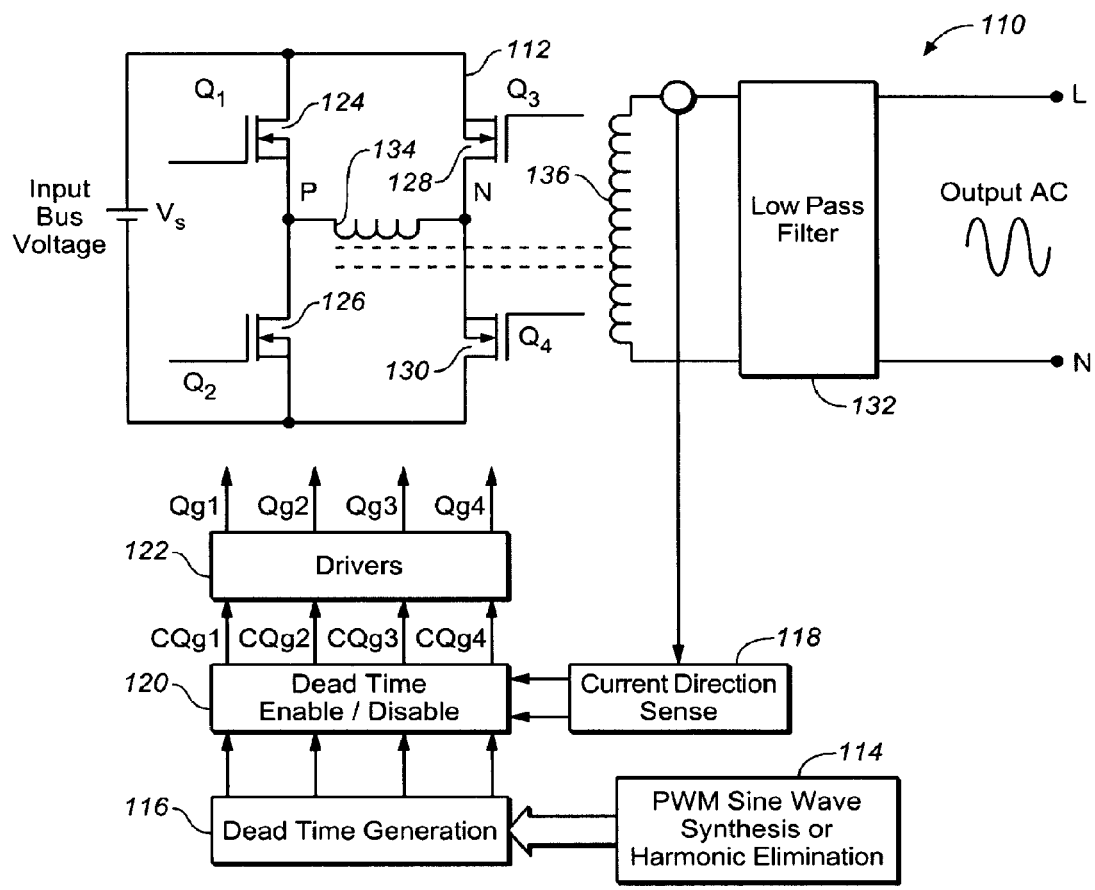
FIG. 3 is a schematic diagram of another exemplary implementation for a power converter system having a full-bridge inverter system with current vector controlled dead-time, according to an embodiment of the invention.

FIG. 3 is a schematic diagram of another exemplary implementation for a power converter system 110 having a full-bridge inverter circuit 112 with current vector controlled dead-time, according to an embodiment of the invention. Power converter system 110 can be a DC-to-AC converter for converting direct current (DC) power to alternating current (AC) power. Power converter system 110 shown in FIG. 3 is similar to power converter system 10 shown in FIG. 1, and as such, includes full-bridge inverter circuit 112, a pulse width modulation (PWM) control block 114, a dead-time generation block 116, a current direction sense block 118, a dead-time enable/disable block 120, a driver block 122, and an output filter 132.

Circuit 112 is another topology for a full-bridge inverter circuit. In this topology, full-bridge inverter circuit 112 includes switches 124, 126, 128, and 130 (also labeled Q1, Q2, Q3, and Q4, respectively). As shown, each of switches 124, 126, 128, and 130 is implemented as an insulated gate bipolar transistor (IGBT). In one embodiment, switches 124 and 126 can have low Vcesat. Switches 124 and 126 are connected at a terminal P in a first leg for the full-bridge inverter circuit 112, and switches 128 and 130 are connected at a terminal N in a second leg.

A primary winding 134 of a transformer is coupled between the terminals P and N in the first and second legs of the full-bridge inverter circuit 112. A secondary winding 136 of the transformer is coupled to the output filter 132. Current flowing through primary winding 134 of the transformer causes current to flow through the secondary winding 136, thereby delivering power from converter system 110.

The full-bridge inverter circuit 112 can be operated in different modes to convert DC power to AC power. In one exemplary operation for the full-bridge inverter circuit 112, the switches in each leg are alternatingly turned on and off during positive and negative half-cycles to deliver AC power to the load through terminals P and N. In particular, in each positive half-cycle, while switch 124 is maintained on and switch 126 is maintained off in the first leg, the switches 128 and 130 in the second leg are alternatingly turned on and off. This causes current to flow from the DC power source through switch 124, through primary winding 134 of the transformer in a first direction (from P to N), and then back either through switch 130 to ground or free wheel the current through the co-pack diode of switch 128. In each negative half-cycle, switch 126 is maintained on and switch 124 is maintained off in the first leg; the switches 128 and 130 in the second leg are alternatingly turned on and off. This causes current to flow from the DC power source through switch 128, through primary winding 134 in a second direction (from N to P, which is opposite the first direction), and back either through switch 126 to ground or free wheel through the co-pack diode of switch 124.

Pulse width modulation (PWM) control block 114, dead-time generation block 116, current direction sense block 118, dead-time enable/disable block 120, and driver block 122 shown in FIG. 3 can operate similarly to PWM control block 14, dead-time generation block 16, current direction sense block 18, dead-time enable/disable block 20, and driver block 22 shown in FIG. 1.

Similar to power converter system 10 of FIG. 1, power converter system 110 in FIG. 3 may introduce dead time between switching only when it is necessary to prevent shoot through. Otherwise, when shoot through is not likely, no dead time is provided. This reduces the THD in system 110. This also allows the size of filter 132 to be reduced.

Figure 4A:
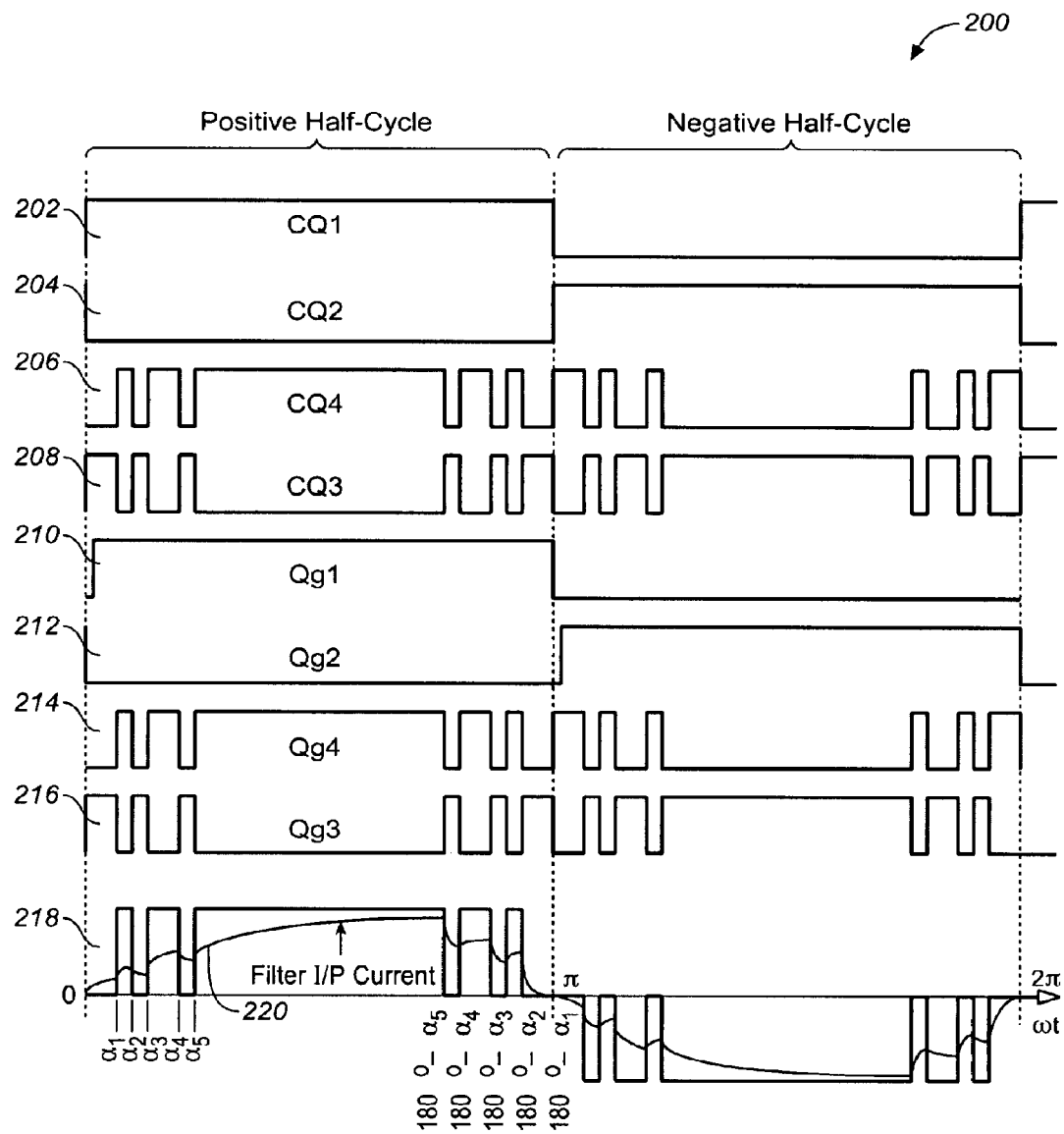
FIGS. 4A and 4B are exemplary timing diagrams for the power converter system shown in FIG. 3, according to an embodiment of the invention.
Figure 4B:
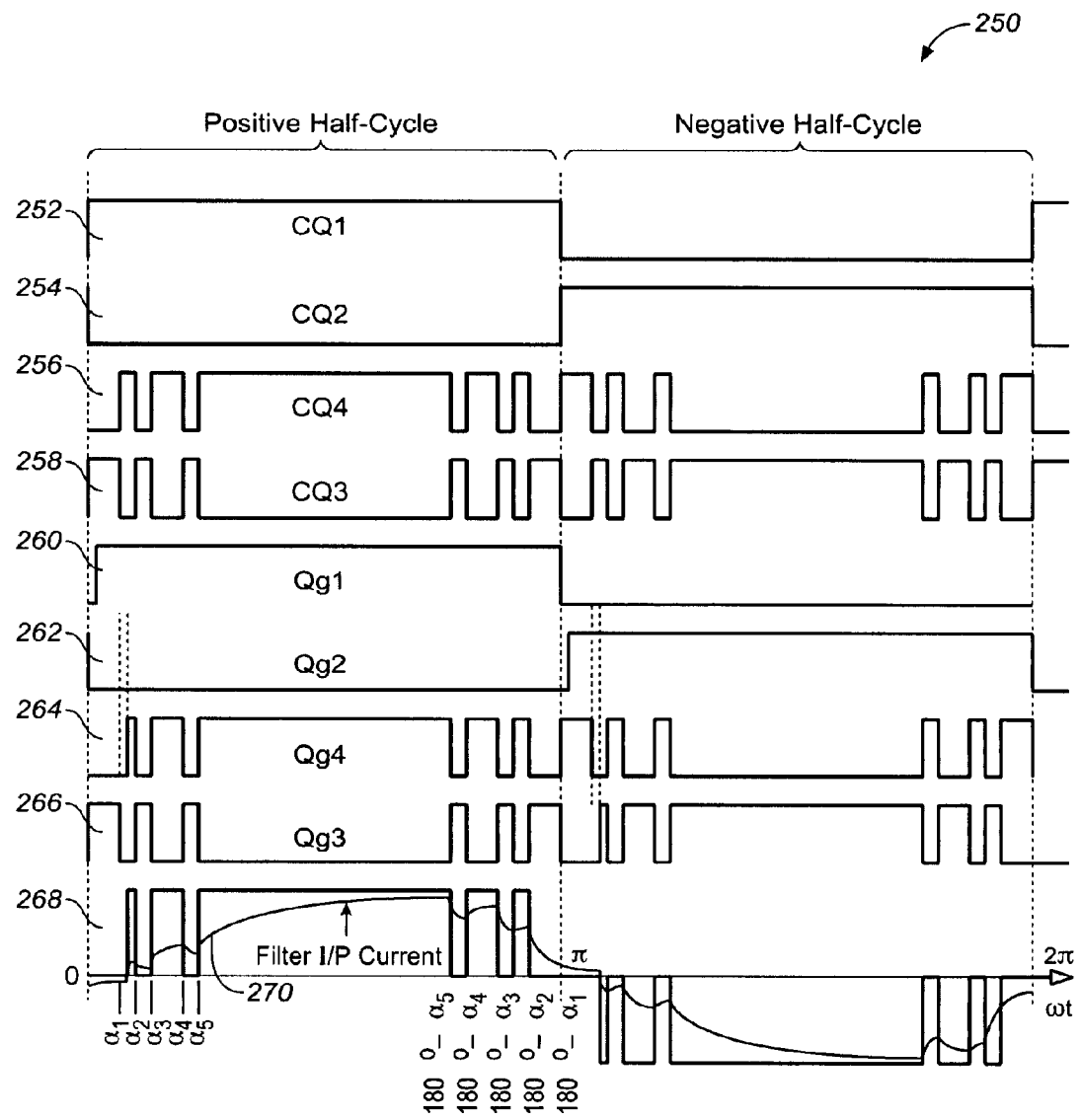

FIGS. 4A and 4B are exemplary timing diagrams for the implementation of the power converter system 110 shown in FIG. 3, according to an embodiment of the invention.

FIG. 4A illustrates a case in which dead time is not necessary. Timing diagram 200 includes a number of waveforms 202, 204, 206, and 208, which generally represent the voltage level for the PWM control signals CQ1, CQ2, CQ3, and CQ4, respectively, output from PWM control block 114 for controlling switches 124, 126, 128, and 130. Waveforms 210, 212, 214, and 216 represent the voltage level for the drive signals Qg1, Qg2, Qg3, and Qg4, respectively, output from driver block 122 for driving switches 124, 126, 128, and 130. Waveform 218 represents the voltage output (at positive terminal P) of the full-bridge inverter circuit 112. Waveform 220, which is superimposed on waveform 218, represents the current flowing in the secondary winding 136 of the transformer. Timing diagram 200 illustrates one cycle for the operation of the power converter system 110. The left side of timing diagram is the positive half-cycle, and the right side of the diagram is the negative half-cycle.

As shown in FIG. 4A, the current flow is always positive in both the positive and negative half-cycles. Thus, dead time is not necessary because shoot through is not likely. Current direction sense block 118 (which is coupled to the secondary winding 136 of the transformer) provides a signal to the dead-time enable/disable block 120 indicating the positive current vector. In response to the indication of positive current vector, dead-time enable/disable block 120 disables the introduction of a dead time (by dead time generation block 116) between the control signals Qg3 and Qg4 applied to switches 128 and 130 in the positive and negative half-cycles. As such, there is almost no delay (dead time), for example, between the moment that switch 128 is turned off and the moment that switch 130 is turned on during the positive half-cycle. In the same way, during the negative half-cycle, dead time can be eliminated or substantially reduced between the moment that switch 130 is turned off and the moment that switch 128 is turned on. Accordingly, the pulse width of PWM control signal are not reduced, and thus harmonic distortion is not increased.

FIG. 4B illustrates a case in which dead time is needed. Timing diagram 250 includes a number of waveforms 252, 254, 256, and 258, which generally represent the voltage level for the PWM control signals CQ1, CQ2, CQ3, and CQ4, respectively, output from PWM control block 114 for controlling switches 124, 126, 128, and 130. Waveforms 260, 262, 264, and 266 represent the voltage level for the drive signals Qg1, Qg2, Qg3, and Qg4, respectively, output from driver block 122 for driving switches 124, 126, 128, and 130. Waveform 268 represents the voltage output (at positive terminal P) of the full-bridge inverter circuit 112. Waveform 270, which is superimposed on waveform 268, represents the current flowing in the secondary winding 136 of the transformer. Timing diagram 250 illustrates one cycle for the operation of the power converter system 110. The left side of timing diagram is the positive half-cycle, and the right side of the diagram is the negative half-cycle.

As shown, the current flow is negative during some portion of each of the positive and negative half-cycles. Thus, dead time is necessary because otherwise shoot through would occur through switches 128 and 130 (in the positive or negative half-cycles). Current direction sense block 118 provides a signal to the dead-time enable/disable block 120 indicating the negative current vector during the relevant portion of the positive or negative half-cycle. In response to the indication of negative current vector, dead-time enable/disable block 120 enables the introduction of a dead time (by dead time generation block 116) between the control signals Qg3 and Qg4 applied to switches 128 and 130 in the positive half-cycle or in the negative half-cycle. As such, there is a delay (dead time), for example, between the moment that switch 128 is turned off and the moment that switch 130 is turned on during the positive half-cycle, or for example, between the moment that switch 128 is turned on and the moment that switch 130 is turned off during the negative half-cycle. Accordingly, shoot-through is prevented.

Figure 5:
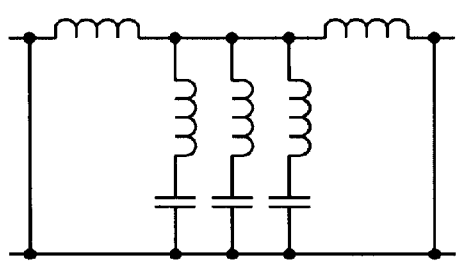
FIG. 5 is a schematic diagram of an exemplary implementation for a low pass filter.

FIG. 5 is a schematic diagram of an exemplary implementation for a low pass filter. Such low pass filter can be used, for example, as the filter 32 of power converter system 10 shown in FIG. 1, or the filter 132 of power converter system 110 shown in FIG. 3.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system comprising:
a switching circuit comprising a full-bridge circuit having a plurality of switches operable to be turned on and off to cause current to flow to deliver power to a load;

a pulse width modulation (PWM) control circuit operable to generate PWM control signals for turning on and off the switches in the switching circuit;

a dead time generation circuit coupled to the control circuit, the dead time generation circuit operable to introduce a dead time into the PWM control signals for the switches in the switching circuit;

a sensor circuit operable to sense the direction of current flow, wherein the direction of current flow is related to a likelihood of shoot-through in the switching circuit, the sensor circuit operable to output a current vector signal indicative of whether the direction of current flow is positive or negative; and a dead time enable/disable circuit coupled to the sensor circuit, the dead time enable/disable circuit operable to enable the introduction of dead time into the PWM control signals in response to the current vector signal being indicative of positive current flow, the dead time enable/disable circuit further operable to disable the introduction of dead time into the PWM control signals in response to the current vector signal from the sensor circuit being indicative of negative current flow, whereby dead time is introduced only when it is necessary to prevent shoot through in the switching circuit.

2. The power converter system of claim 1 wherein the full-bridge circuit comprises a full-bridge inverter circuit.

3. The power converter system of claim 1 wherein the full-bridge circuit comprises a full-bridge rectifier circuit.

4. The power converter system of claim 1 wherein the plurality of switches in the switching circuit are arranged in a first leg and a second leg, wherein the switches in the first leg and the second leg are operable to be turned on and off in cycles to deliver power to the load.

5. The power converter system of claim 4 wherein the dead time generation circuit introduces dead time between the turning off of a first switch in the first leg and the turning on of a second switch in the first leg.

6. The power converter system of claim 1 wherein at least some of the switches of the switching circuit each comprises a metal-oxide-semiconductor field effect transistors (MOSFET).

7. The power converter system of claim 1 wherein at least some of the switches of the switching circuit each comprises an insulated gate bipolar transistors (IGBT).

8. The power converter system of claim 1 comprising a low pass filter coupled to the switching circuit, the low pass filter operable to reduce total harmonic distortion (THD) in the power converter system.

9. The power converter system of claim 1 comprising a transformer having a primary winding and a secondary winding, wherein the primary winding is coupled to the switching circuit.

10. The power converter system of claim 1 wherein the power converter system is a DC-to-AC converter.

11. The power converter system of claim 1 wherein the power converter system is a AC-to-DC converter.

12. The power converter system of claim 1 wherein the switches of the switching circuit are turned on and off in cycles.

13. The power converter system of claim 12 wherein each cycle comprises a positive half-cycle and a negative half-cycle.

14. The power converter system of claim 1 wherein the sensor circuit comprises a current comparator.

15. A method for operating a power converter system comprising a switching circuit, the switching circuit comprising a full-bridge circuit having a plurality of switches operable to be turned on and off to cause current to flow to deliver power to a load, the method comprising:

generating PWM control signals for turning on and off the switches in the switching circuit;

sensing the direction of current flow, wherein the direction of current flow is related to a likelihood of shoot-through in the switching circuit;

providing a current vector signal indicative of whether the direction of current flow is positive or negative;

enabling introduction of a dead time into the PWM control signals for the switches in the switching circuit in response the current vector signal being indicative of positive current flow; and disabling introduction of a dead time into the PWM control signals for the switches in the switching circuit in response the current vector signal being indicative of negative current flow;

whereby dead time is introduced only when it is necessary to prevent shoot through in the switching circuit.

16. The method of claim 15 wherein the full-bridge circuit comprises a full-bridge inverter circuit.

17. The method of claim 15 wherein the full-bridge circuit comprises a full-bridge rectifier circuit.

18. The method of claim 15 wherein the plurality of switches in the switching circuit are arranged in a first leg and a second leg.

19. The method of claim 18 comprising turning on and off the switches in the first leg and the second leg in cycles to deliver power to the load.

20. The method of claim 19 comprising introducing dead time between the turning off of a first switch in the first leg and the turning on of a second switch in the first leg.

21. The method of claim 15 wherein the switches of the switching circuit are turned on and off in cycles.

22. The method of claim 21 wherein each cycle comprises a positive half-cycle and a negative half-cycle.

23. A power converter system comprising:

a full-bridge inverter circuit having a plurality of switches operable to be turned on and off to cause current to flow to deliver power to a load;

a pulse width modulation (PWM) control circuit operable to generate PWM control signals for turning on and off the switches in the full-bridge inverter circuit;

a dead time generation circuit coupled to the control circuit, the dead time generation circuit operable to introduce a dead time into the PWM control signals for the switches in the full-bridge inverter circuit;

a sensor circuit operable to sense the direction of current flow, wherein the direction of current flow is related to a likelihood of shoot-through in the full-bridge inverter circuit, the sensor circuit operable to output a current vector signal indicative of whether the direction of current flow is positive or negative; and a dead time enable/disable circuit coupled to the sensor circuit, the dead time enable/disable circuit operable to enable the introduction of dead time into the PWM control signals in response the current vector signal being indicative of positive current flow, the dead time enable/disable circuit further operable to disable the introduction of dead time into the PWM control signals in response to the current vector signal from the sensor circuit being indicative of negative current flow, whereby dead time is introduced only when it is necessary to prevent shoot through in the switching circuit.

24. The power converter system of claim 23 wherein the plurality of switches in the full-bridge inverter circuit are arranged in a first leg and a second leg, wherein the switches the first leg and the second leg are operable to be turned on and off in cycles to deliver power to the load.

25. The power converter system of claim 24 wherein the dead time generation circuit introduces dead time between the turning off of a first switch in the first leg and the turning on of a second switch in the first leg.

26. The power converter system of claim 23 wherein at least some of the switches of the full-bridge inverter circuit each comprises a metal-oxide-semiconductor field effect transistors (MOSFET).

27. The power converter system of claim 23 wherein at least some of the switches of the full-bridge inverter circuit each comprises an insulated gate bipolar transistors (IGBT).

28. The power converter system of claim 23 comprising a low pass filter coupled to the full-bridge inverter circuit, the low pass filter operable to reduce total harmonic distortion (THD) in the power converter system.

29. The power converter system of claim 23 comprising a transformer having a primary winding and a secondary winding, wherein the primary winding coupled to the full-bridge inverter circuit.

30. The power converter system of claim 23 wherein the power converter system is a DC-to-AC converter.

31. The power converter system of claim 23 wherein the switches of the full-bridge inverter circuit are turned on and off in cycles.

32. The power converter system of claim 31 wherein each cycle comprises a positive half-cycle and a negative half-cycle.

33. The power converter system of claim 23 wherein the sensor circuit comprises a current comparator.

34. A method for a power converter system having a full-bridge inverter circuit having a plurality of switches operable to be turned on and off to cause current to flow to deliver power to a load, the method comprising:
  generating PWM control signals for turning on and off the switches in the full-bridge inverter circuit;
  sensing the direction of current flow, wherein the direction of current flow is related to a likelihood of shoot-through in the full-bridge inverter circuit;
  providing a current vector signal indicative of whether the direction of current flow is positive or negative;
  enabling introduction of a dead time into the PWM control signals for the switches in the full-bridge inverter circuit in response the current vector signal being indicative of positive current flow; and
  disabling introduction of a dead time into the PWM control signals for the switches in the switching circuit in response the current vector signal being indicative of negative current flow;
  whereby dead time is introduced only when it is necessary to prevent shoot through in the switching circuit.

35. The method of claim 34 wherein the plurality of switches in the switching circuit are arranged in a first leg and a second leg.

36. The method of claim 35 comprising turning on and off the switches in the first leg and the second leg in cycles to deliver power to the load.

37. The method of claim 36 comprising introducing dead time between the turning off of a first switch in the first leg and the turning on of a second switch in the first leg.

38. The method of claim 34 wherein the switches of the switching circuit are turned on and off in cycles.

39. The method of claim 38 wherein each cycle comprises a positive half-cycle and a negative half-cycle.

\* \* \* \* \*